US 8,954,171 B2

(12) United States Patent
Son

(10) Patent No.: US 8,954,171 B2
(45) Date of Patent: Feb. 10, 2015

(54) ANALOG/DIGITAL AUDIO CONVERTER AND A METHOD THEREOF

(75) Inventor: Tae-yong Son, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1774 days.

(21) Appl. No.: 11/116,287

(22) Filed: Apr. 28, 2005

(65) Prior Publication Data

US 2006/0100725 A1  May 11, 2006

(30) Foreign Application Priority Data

Nov. 9, 2004  (KR) .................. 10-2004-0090653

(51) Int. Cl.
G06F 17/00 (2006.01)
H04B 3/00 (2006.01)
H04R 5/02 (2006.01)
H04N 5/60 (2006.01)
H04N 5/46 (2006.01)

(52) U.S. Cl.
CPC . *H04N 5/602* (2013.01); *H04N 5/46* (2013.01)
USPC ................ 700/94; 381/81; 381/306

(58) Field of Classification Search
USPC ............. 700/94; 386/96–104, 232; 348/738, 348/555; 725/153
See application file for complete search history.

(56) References Cited

U.S. PATENT DOCUMENTS

| | | | |
|---|---|---|---|
| 6,192,427 B1 * | 2/2001 | Li et al. ........................... 710/52 |
| 6,490,001 B1 * | 12/2002 | Shintani et al. ............... 348/554 |
| 6,741,293 B1 * | 5/2004 | Obuchi ......................... 348/554 |
| 6,772,354 B2 * | 8/2004 | Takenaka et al. ............. 713/310 |
| 7,233,781 B2 * | 6/2007 | Hunter et al. ............... 455/404.1 |
| 7,260,308 B2 * | 8/2007 | Engle et al. .................... 386/250 |
| 7,436,457 B2 * | 10/2008 | Lee et al. ........................ 348/554 |
| 7,646,968 B1 * | 1/2010 | Wang et al. .................... 386/239 |
| 2001/0009548 A1 * | 7/2001 | Morris .......................... 370/392 |
| 2002/0057893 A1 * | 5/2002 | Wood et al. ..................... 386/46 |
| 2002/0095689 A1 * | 7/2002 | Novak .......................... 725/151 |
| 2003/0056221 A1 * | 3/2003 | Zhang et al. .................... 725/70 |
| 2004/0119893 A1 * | 6/2004 | Burnworth .................... 348/705 |
| 2004/0244033 A1 * | 12/2004 | Ostensoe et al. ................ 725/25 |
| 2005/0063418 A1 * | 3/2005 | Case ............................. 370/466 |
| 2005/0166252 A1 * | 7/2005 | Hallberg ....................... 725/134 |
| 2008/0072272 A1 * | 3/2008 | Robertson et al. ............ 725/126 |

FOREIGN PATENT DOCUMENTS

| | | |
|---|---|---|
| JP | 11-164240 | 6/1999 |
| JP | 11-225292 | 8/1999 |

(Continued)

OTHER PUBLICATIONS

Harman Kardon, Inc., "AVR 630 Audio/Video Receiver Owners Manual", copywrite 2003, Harman Kardon Inc., pp. 1-54.*

(Continued)

*Primary Examiner* — Davetta W Goins
*Assistant Examiner* — Daniel Sellers
(74) *Attorney, Agent, or Firm* — Staas & Halsey LLP

(57) ABSTRACT

An analog/digital audio converting apparatus enables listening to both digital and analog audio signals received from a digital receiving apparatus and analog audio signals input from an external source using the same receiver by providing a formatter capable of converting the analog audio signal into a digital audio signal with the digital broadcasting receiving apparatus.

28 Claims, 2 Drawing Sheets

(56) References Cited

FOREIGN PATENT DOCUMENTS

| | | |
|---|---|---|
| JP | 2001-256694 | 9/2001 |
| JP | 2002-112145 | 4/2002 |
| JP | 2003-152574 | 5/2003 |
| JP | 2003-304461 | 10/2003 |
| KR | 20-262157 | 3/2002 |

OTHER PUBLICATIONS

Korean Office Action dated Jul. 28, 2006 issued in KR 2004-90653.

* cited by examiner

ANALOG/DIGITAL AUDIO CONVERTER AND A METHOD THEREOF

CROSS-REFERENCE TO RELATED APPLICATIONS

This application claims the benefit under 35 U.S.C. §119 of Korean Patent Application No. 2004-90653, filed Nov. 9, 2004, in the Korean Intellectual Property Office, the disclosure of which is incorporated herein in its entirety by reference.

BACKGROUND OF THE INVENTION

1. Field of the Invention

The present general inventive concept relates to an analog/digital audio output apparatus. More particularly, the present general inventive concept relates to an audio output apparatus to enable reception of an analog audio signal in a digital broadcasting receiving apparatus through an external receiver.

2. Description of the Related Art

Audio signals received and processed in a digital broadcasting receiving apparatus comprise AC-3 and moving picture experts group (MPEG) data, which are decoded using a software codec capable of compressing and playing a digital audio signal processed by a digital signal processor (hereinafter, referred to as "digital audio DSP"), or without a dedicated hardware, and analog-processed to be output through a speaker. If being provided with a dedicated external audio/video (AV) receiver, a user can output the AC-3 and the MPEG data received through the digital broadcasting receiving apparatus as a digital signal without causing any loss of the data, connect the digital broadcasting receiving apparatus to the external A/V receiver, decode the digital signal at the digital audio DSP in the external A/V receiver and output the decoded signal through a speaker. Among digital audio interfaces for the above operations, a SONY®/PHILIPS® digital interface (SPDIF) is a prevailing one for domestic use.

The SPDIF has a digital output standard produced by SONY® corporation and ROYAL PHILIPS® Electronics, and FIG. 1 schematically shows a block diagram of a conventional digital broadcasting receiving apparatus for processing a digital output of the SPDIF. Referring to FIG. 1, the conventional digital broadcasting receiving apparatus mainly comprises a digital processing part and an analog processing part.

The digital processing part comprises a tuner 10 for receiving a channel from an external sky wave, a cable, and a satellite, a channel demodulator (demod) 20 for outputting a transport stream (TS) corresponding to the received channel, a multimedia processor 50 including a TS demultiplexer (demux), an MPEG decoder and a graphic mixer, a controller (CPU) 40 for controlling the overall system, and a digital audio DSP 60 for processing the digital audio. The multimedia processor 50 outputs an image as a video out signal, a super video (S-video) out signal, or a digital video interactive (DVI) signal.

The digital audio DSP 60 outputs the SPDIF output (digital out) to the outside or transmits a digital audio signal to a national television system committee (NTSC) audio decoder 70 so as to enable a user to listen to the digital audio signal through an external speaker.

In general, the conventional digital broadcasting receiving apparatus is able to receive and process conventional analog broadcasting. Here, an audio signal in such a conventional analog broadcasting is in accordance with the NTSC.

The analog processing part comprises an NTSC intermediate frequency (IF) converter or decoder 30 for converting the channel received by the tuner 10 into an IF signal and the NTSC audio decoder 70 for processing the NTSC audio signal, that is, the IF signal. Also, even an externally input audio signal is input to the NTSC audio decoder 70 so as to be processed to the left or the right according to a user's choice and transmitted as a L/R out signal to the external speaker. The NTSC IF converter 30 outputs an NTSC video signal to the multi-media processor.

In the conventional digital broadcasting receiving apparatus as described above, the NTSC audio signal is volume-controlled by the NTSC audio decoder 70, output to the left or the right and input to the speaker or other external devices, such as a video cassette recorder (VCR) for recording.

The user utilizing the external receiver (not shown) connects the SPDIF output from the digital audio DSP 60 of the digital broadcasting receiving apparatus to an input terminal of the external receiver and decodes the SPDIF in a digital audio DSP of the external receiver to thereby listen to the sound through the external speaker. Usually, volume of the conventional digital broadcasting receiving apparatus is set to '0' because the volume of the digital broadcasting receiving apparatus is turned down when receiving through the external receiver.

In a case of converting the channel to the NTSC signal or receiving the external input audio signal, such as from the VCR, the audio signal at this time is in the analog form, and therefore, the user needs to turn up the volume of the conventional digital broadcasting receiving apparatus to listen to the sound.

In other words, when the digital broadcasting receiving apparatus is receiving NTSC broadcasting or processing an input from the external VCR, the user who uses a separate receiver having the digital audio DSP suffers an inconvenience of turning up the volume of the conventional digital broadcasting receiving apparatus which is primarily set to '0', in order to listen to the sound through the external speaker.

SUMMARY OF THE INVENTION

The present general inventive concept provides an apparatus capable of converting an analog audio signal to a digital audio signal and outputting the digital audio signal through a SONY®/PHILIPS® digital interface (SPDIF), such that a user who utilizes a dedicated receiver having a digital audio digital signal processor (DSP) therein is able to listen to the analog audio signal through an external speaker.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an analog/digital audio converting apparatus usable with a digital broadcasting receiving apparatus, the analog/digital audio converting apparatus comprising an audio decoder to select and output at least one of input analog audio signals, an output device to separate a digital audio signal from input signals of the digital broadcasting receiving apparatus and to output the separated signal as a first digital audio signal, a formatter to process the analog audio signal output from the audio decoder and to output the processed signal as a second digital audio signal, and a digital audio processing device to select and output one of the first digital audio signal output from the output device and the second digital audio signal output from the formatter.

The digital audio processing device may select and output one of the first and the second digital audio signals according to a selecting signal input externally. Alternatively, the digital audio processing device may select the second digital audio signal output from the formatter upon receiving a signal to select the signal output from the audio decoder.

At least one of the analog audio signals input to the audio decoder may be an analog audio signal output from the digital broadcasting receiving apparatus or an analog audio signal input from an external device. The first and the second digital audio signals may be SONY®/PHILIPS® digital interface (SPDIF) signals.

The formatter may be disposed within the digital audio processor, such that the analog audio signal output from the audio decoder is processed into the second digital audio signal, and one of the first and the second digital audio signals is selectively output.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
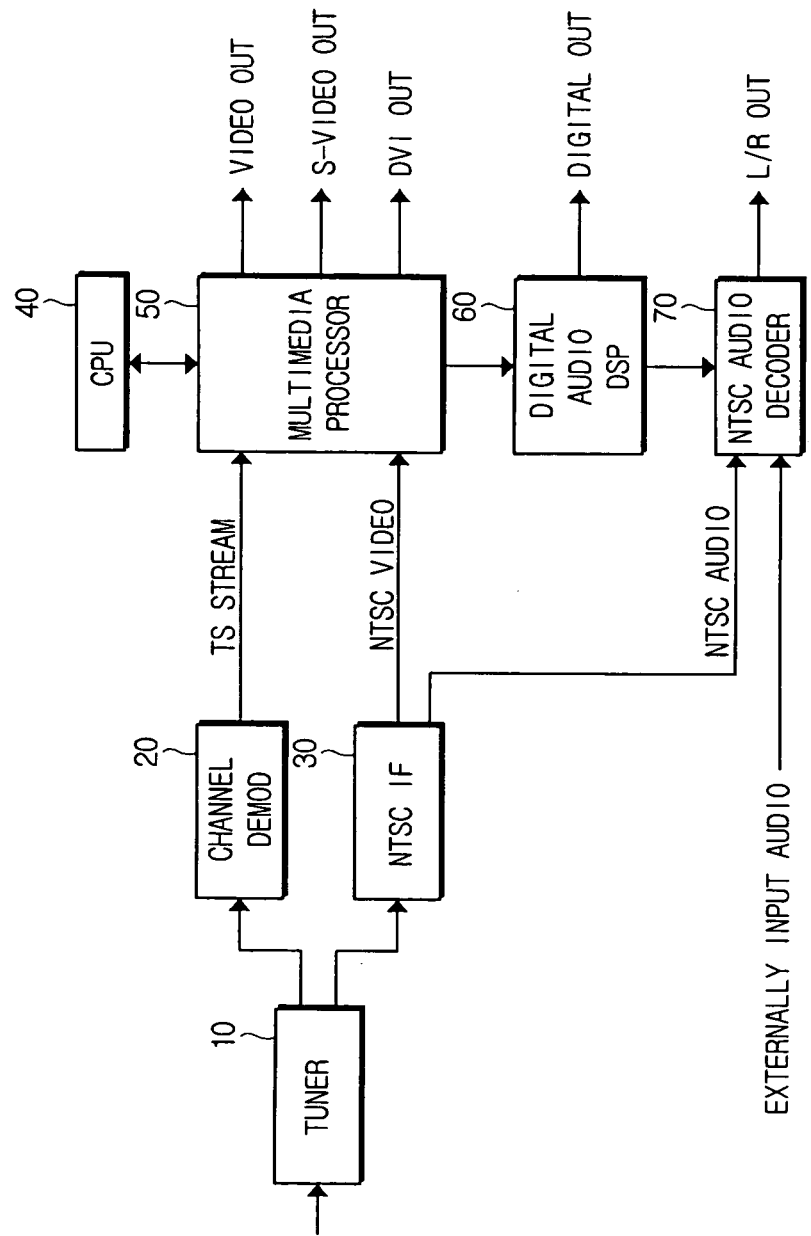
FIG. 1 is a block diagram of a conventional digital broadcasting receiving apparatus for processing a SONY®/PHILIPS® digital interface.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
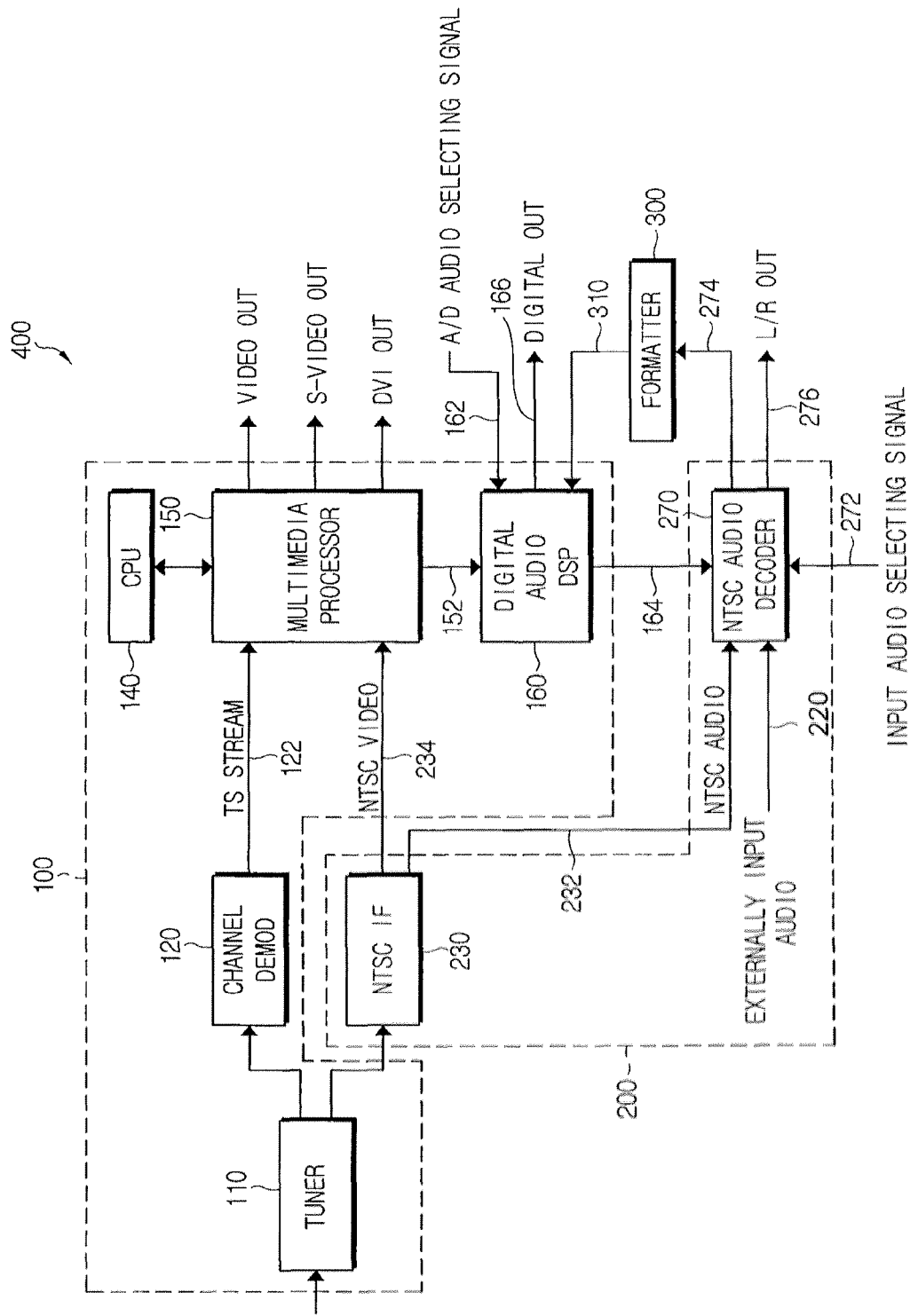
FIG. 2 is a block diagram illustrating a digital broadcasting receiving apparatus according to an embodiment of the present general inventive concept.

FIG. 2 is a block diagram illustrating a digital broadcasting receiving apparatus 400 according to an embodiment of the present general inventive concept.

Referring to FIG. 2, the digital broadcasting receiving apparatus 400 comprises a digital processing part 100, an analog processing part 200, and a formatter 300 to convert an audio signal output from the analog processing part 200 into a digital signal and to input the converted signal into the digital processing part 100.

The digital processing part 100 comprises a tuner 110 to receive a predetermined channel from an external sky wave, a cable, and a satellite, a channel demodulator (demod) 120 to process an intermediate frequency (IF) corresponding to the channel and to output a transport stream (TS) 122, a multimedia processor 150 including therein a TS demultiplexer (demux), a moving picture experts group (MPEG) decoder, and a graphic mixer, a controller (CPU) 140 to control the overall system, and a digital audio processor 160 (hereinafter, referred to as "digital audio DSP") to receive a first digital audio signal 152 output from the multimedia processor 150 and to process the received first digital audio signal 152. Here, the multimedia processor 150 processes and outputs the TS 122 as an image through a video output or a super-video (S-video) output or as a digital video interactive (DVI) output which is a type of compressed data used to record a moving image as digital data, and separates a digital audio signal from received signals of the TS stream 122 to output the separated digital audio signal as the first digital audio signal 152.

The digital audio DSP 160 processes and outputs the first digital audio signal 152 through a SONY®/PHILIPS® digital interface (SPDIF) externally as a digital output signal 166, thereby enabling a user who utilizes an external receiver (not shown) to receive and listen to the digital output signal 166. More specifically, the SPDIF of the digital audio DSP 160 can be connected to an input terminal of the external receiver and the digital output signal 166 can be decoded at a digital audio DSP of the external receiver. Accordingly, the user can listen to sound corresponding to the digital output signal 166 through an external speaker, such as earphones. Further, the digital audio DSP 160 is constructed to decode the first digital audio signal 152 output from the multimedia processor 150, separately output the decoded signal as different types of audio data, convert the output audio data into an analog audio signal, synthesize the analog audio signal as a multi-channel audio signal 164 and output the multi-channel audio signal 164 to a national television system committee (NTSC) audio decoder 270, which will be explained in greater detail below, so that the sound can be listened to through the external speaker.

Also, an analog/digital audio selecting signal 162 is input an external source to select one of the first digital audio signal 152 and a second digital audio signal 310 input from the formatter 300. The digital audio DSP 160 outputs the selected signal as the digital output signal 166.

The analog processing part 200 comprises an NTSC IF decoder 230 and the NTSC audio decoder 270. The NTSC IF decoder 230 amplifies the IF signal corresponding to the channel received by the tuner 110 and separates the amplified IF signal into an NTSC audio signal 232 and an NTSC video signal 234. The NTSC IF decoder 230 outputs the separated NTSC video signal 234 to the multimedia processor 150 and the separated NTSC audio signal 232 to the NTSC audio decoder 270. The NTSC audio decoder 270 receives an input audio selecting signal 272, which is to select any one of the separated NTSC audio signal 232, an externally-input audio signal 220, and the multi-channel audio signal 164 output from digital audio DSP 160, amplifies the audio signal selected by the input audio selecting signal 272, and outputs the amplified signal as a left/right (L/R) output signal 276, to transmit the left/right (L/R) output signal 276 to an external speaker. In addition, the NTSC audio decoder 270 outputs the amplified signal as an NTSC audio signal 274 to the formatter 300 in order to digitally convert the selected audio signal.

The formatter 300 receives the NTSC audio signal 274 output from the NTSC audio decoder 270, processes the NTSC audio signal 274 to convert the NTSC audio signal 274 into the second digital audio signal 310 to be input into the digital audio DSP 160. Here, the NTSC audio signal 274 may be the same as the L/R output signal 276 output from the NTSC audio decoder 270.

The formatter 300 converts the input NTSC audio signal 274 into the second digital audio signal 310 using an analog/digital (A/D) converter, compresses and outputs the second digital audio signal 310 to the digital audio DSP 160, which can output the second digital audio signal 310 as the digital output signal 166 according to the analog/digital selecting signal 162. The formatter 300 may have various types of structure to receive and digitally output various analog audio signals. The formatter 300 may alternatively be disposed inside the digital audio DSP 160 instead of separately provided, as illustrated in FIG. 2. In other words, the digital audio DSP 160 can be capable of converting and outputting an input analog audio signal as a digital audio signal, and the NTSC audio signal 274 output from the NTSC audio decoder 270 can be directly input to the digital audio DSP 160 to be processed therein.

In the digital broadcasting receiving apparatus 400, as described above, even while the digital output signal 166 output from the digital audio DSP 160 externally is received through the external receiver (not shown), if the user selects the analog audio by operating the A/D audio selecting signal 162, the digital audio DSP 160 can select the second digital audio signal 310 output from the formatter 300, thereby enabling the user to digitally listen to the analog audio through the external receiver.

Herein, the second digital audio signal 310 output from the formatter 300 corresponds to the selected one of the NTSC audio signal 232 separated from the NTSC IF decoder 230, the externally-input audio signal 220, and the multi-channel audio signal 164 output from the digital audio DSP 160, according to the input audio selecting signal 272. Thus, the user can select the analog audio signal (NTSC audio signal 274) as desired, by operating the input audio selecting signal 272.

Accordingly, the formatter 300 to convert the selected analog audio signal 274 into the second digital audio signal 310 enables listening to the selected analog audio signal 274 or the second digital audio signal through the external receiver as desired by the user, without inconveniences of a conventional digital broadcasting receiving apparatus, such as having to listen to the sound only through the external receiver and change the channel to an analog channel when receiving a digital broadcasting, and having to convert to an internal speaker to connect to an external device, such as video cassette recorder (VCR).

As described above, in a digital outputting apparatus usable with an analog audio signal according to the present general inventive concept, when receiving an analog broadcasting signal through a digital broadcasting receiving apparatus or through an external device, such as VCR, a user utilizing a dedicated receiver including a digital audio DSP therein can receive and listen to sound through an external speaker.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An analog/digital audio converting apparatus usable with a digital receiving apparatus, comprising:
    an analog decoder to receive an analog input signal and to separate the analog input signal into an analog audio signal and an analog video signal;
    an audio decoder to receive a plurality of input audio signals including the analog audio signal, and a first selection signal controllable by a user to select and output at least one of the plurality of input audio signals;
    multimedia processor to receive the analog video signal, to separate a digital audio signal from a digital video signal, to output the separated digital audio signal as a first digital audio signal, and to selectively output one of the analog video signal and the digital video signal;
    a formatter to process the audio signal output from the audio decoder and to output the processed signal as a second digital audio signal; and
    a digital audio processing device to receive each of the first digital audio signal and the second digital audio signal, and a second selection signal controllable by a user to select and output one of the first digital audio signal and the second digital audio signal,
    wherein the audio decoder receives a first analog audio signal from a tuner and a multi-channel audio signal from the digital audio processing device, selects from among at least the first analog audio signal and the multi-channel audio signal, and outputs the selected audio signal as an output audio signal, and
    the digital audio processing device outputs the selected one of the first digital audio signal and the second digital audio signal to an external receiver as a digital audio output signal without transmitting the digital audio output signal to the audio decoder.

2. The converting apparatus of claim 1, wherein the digital audio processing device selects and outputs the one of the first and the second digital audio signals according to a selecting signal input from an external source.

3. The converting apparatus of claim 1, wherein the digital audio processing device selects the second digital audio signal output from the formatter upon receiving a signal to select the second digital signal output from the audio decoder.

4. The converting apparatus of claim 1, wherein the first and the second digital audio signals comprise SONY/PHILIPS digital interface (SPDIF) signals.

5. The converting apparatus of claim 1, wherein the plurality of input audio signals to the audio decoder includes a second analog audio signal input from an external device.

6. An analog/digital audio converting apparatus usable with a digital broadcasting receiving apparatus, comprising:
    an analog decoder to receive an analog input signal and to separate the analog input signal into an analog audio signal and an analog video signal;
    an audio decoder to receive a plurality of input audio signals including the analog audio signal, and to select and output at least one of the plurality of input audio signals;
    a multimedia processor to receive the analog video signal, to separate a digital audio signal from a digital video signal, to selectively output one of the analog video signal and the digital video signal, and to output the separated digital audio signal as a first digital audio signal; and
    a digital audio processing device to receive the first digital audio signal and the at least one audio signal output from the audio decoder, to process the at least one audio signal output from the audio decoder to generate a second digital audio signal, and to select and output one of the first digital audio signal and the second digital audio signal,
    wherein the audio decoder receives a first analog audio signal from a tuner and a multi-channel audio signal from the digital audio processing device, selects from among at least the first analog audio signal and the multi-channel audio signal, and outputs the selected audio signal as an output audio signal, and
    the digital audio processing device outputs the selected one of the first digital audio signal and the second digital audio signal to an external receiver as a digital audio output signal without transmitting the digital audio output signal to the audio decoder.

7. The converting apparatus of claim 6, wherein the digital audio processing device selects and outputs the one of the first and the second digital audio signals according to a selecting signal input from an external source.

8. The converting apparatus of claim 6, wherein the digital audio processing device selects the second digital audio signal upon receiving a signal to select the second digital audio signal.

9. The converting apparatus of claim 6, wherein the first and the second digital audio signals comprise SONY/PHILIPS digital interface (SPDIF) signals.

10. The converting apparatus of claim 6, wherein the plurality of input audio signals to the audio decoder includes a second analog audio signal input from an external device.

11. A digital broadcasting receiving apparatus, comprising:
an analog decoder to receive an analog input signal and to separate the analog input signal into an analog audio signal and an analog video signal;
an audio decoder to receive a plurality of input signals including the analog audio signal, and to selectively output one of the plurality of input audio signals;
a formatter to convert the selected audio signal into a converted digital audio signal; and
a digital audio signal processor to receive an input digital audio signal and to selectively output one of the input digital audio signal and the converted digital audio signal as a digital output signal,
wherein the audio decoder receives a first analog audio signal from a tuner and a multi-channel audio signal from the digital audio signal processor, selects from among at least the first analog audio signal and the multi-channel audio signal, and outputs the selected audio signal as an audio output signal, and
the digital audio signal processor outputs the selected one of the input digital audio signal and the converted digital audio signal to an external receiver as a digital audio output signal without transmitting the digital audio output signal to the audio decoder.

12. The digital broadcasting receiving apparatus of claim 11, further comprising:
a multimedia processor to receive the analog video signal, to process an input digital signal to separate the input digital audio signal and an input image signal from the input digital signal, to selectively output one of the analog video signal and the input image signal, and to transmit the input digital audio signal to the digital audio signal processor.

13. The digital broadcasting receiving apparatus of claim 12, further comprising:
the tuner to receive a broadcasting signal;
a channel demodulator to output a TS stream; and
an IF decoder to generate the analog input signal.

14. The digital broadcasting receiving apparatus of claim 11, wherein the digital audio signal processor comprises a first terminal to receive the input digital audio signal, a second terminal to output the converted digital audio signal to the audio decoder, and a third terminal to output the one of the input digital audio signal and the converted digital audio signal.

15. The digital broadcasting receiving apparatus of claim 11, wherein the first analog audio signal is an NTSC audio signal and the plurality of input audio signals to the analog decoder further comprises an externally input audio signal that is input directly to the audio decoder.

16. The digital broadcasting receiving apparatus of claim 11, wherein the digital audio signal processor comprises a single output terminal to output the one of the input digital audio signal and the converted digital audio signal.

17. A method of digitally converting an analog audio signal, the method comprising:
separating an analog signal into an analog audio signal and an analog video signal;
receiving at an audio decoder a plurality of audio signals including the analog audio signal without the analog video signal, and at least one multi-channel analog audio signal;
selecting and outputting from the audio decoder at least one of the plurality of audio signals;
separating a digital audio signal from input signals of a digital receiving apparatus and outputting the separated digital audio signal as a first digital audio signal;
processing the at least one output audio signal into a digital signal and outputting the processed digital signal as a second digital audio signal; and
selecting and outputting one of the first digital audio signal and the second digital audio signal to an external receiver as a digital audio output signal without transmitting the digital audio output signal to the audio decoder.

18. The method of claim 17, wherein the selecting and outputting of the one of the first digital audio signal and the second digital audio signal comprises:
selecting and outputting one of the first and the second digital audio signals according to a selecting signal input from an external source.

19. The method of claim 17, wherein the selecting and outputting of the one of the first digital audio signal and the second digital audio signal comprises:
selecting and outputting the second digital audio signal upon receiving a signal to select the second digital audio signal.

20. The method of claim 17, wherein the first and the second digital audio signals comprise SONY/PHILIPS digital interface (SPDIF) signals.

21. The method of claim 17, wherein the first analog audio signal is output from the digital broadcasting receiving apparatus and the plurality of audio signals further includes a second analog audio signal input from an external device.

22. A signal converting apparatus for use with a digital broadcast receiving apparatus, comprising:
an analog signal decoder to receive an input analog signal and to separate the input analog signal into a first analog audio signal and an analog video signal;
a multimedia processor to receive the analog video signal, to separate a first digital audio signal from a digital broadcast signal, to selectively output one of the analog video signal and a digital video signal from the digital broadcast signal, and to output the first digital audio signal;
an audio decoder to receive a plurality of audio signals including the first analog audio signal and to output a selected one of the plurality of audio signals; and
a digital audio signal processor to process the first digital audio signal into a converted audio signal for output by the audio decoder, and to process the selected one of the plurality of audio signals into a converted digital audio signal for output,
wherein the audio decoder receives a multi-channel audio signal from the digital audio signal processor, selects from among at least the first analog audio signal and the multi-channel audio signal, and outputs the selected audio signal as an output audio signal, and
the digital audio signal processor outputs a selected one of the converted analog audio signal and the converted digital audio signal to an external receiver as a digital audio output signal without transmitting the digital audio output signal to the audio decoder.

23. A method of converting a signal for output, the method comprising:
- separating a first digital audio signal from a digital broadcast signal and outputting the first digital audio signal to a digital audio signal processor;
- separating an input analog signal into an analog video signal and a first analog audio signal;
- selecting with an audio decoder one of a plurality of received audio signals including the first analog audio signal and a multi-channel audio signal received from the digital audio signal processor, outputting the selected audio signal as an audio output signal to a speaker, and outputting the selected audio signal to the digital audio signal processor;
- processing at the digital audio signal processor the first digital audio signal into a converted audio signal and the selected audio signal of the plurality of received audio signals to a second digital audio signal; and
- outputting the first digital audio signal, the converted audio signal, and the second digital audio signal to an external receiver according to a user selection,
- wherein the plurality of received audio signals includes the converted audio signal.

24. A digital broadcasting receiving apparatus, comprising:
- a tuner to receive a broadcast signal and to output a digital broadcast signal and an analog broadcast signal according to the received broadcast signal;
- an analog decoder to separate the analog broadcast signal into an analog audio signal and an analog video signal;
- an audio decoder to receive a plurality of audio input signals including the analog audio signal without the analog video signal and to output one of the audio input signals as an audio output signal based on a first external selection signal;
- a formatter to format the audio output signal into a first digital audio signal;
- a multimedia processor to receive each of the digital broadcast signal and the analog video signal and to output a plurality of different video signals of different formats, and to output a second digital audio signal corresponding to the digital broadcast signal; and
- a digital audio processor to receive the first digital audio signal and the second digital audio signal and to output one of the first digital audio signal and the second audio signal as a digital output signal based on a second external selection signal,
- wherein the plurality of audio input signals includes a multi-channel audio signal generated by the digital audio processor corresponding to the first digital audio signal.

25. The digital broadcasting receiving apparatus according to claim 24, wherein the multi-channel audio signal is an analog signal, and
- the digital audio processor converts the first digital audio signal into the analog multi-channel audio signal.

26. The digital broadcasting receiving apparatus according to claim 24, wherein the digital broadcast signal is a TS stream and the analog broadcast signal is an NTSC signal.

27. The digital broadcasting receiving apparatus according to claim 24, wherein the digital audio processor outputs the digital output signal to a receiver, and
- the audio decoder outputs the output signal to at least one audio speaker.

28. The converting apparatus of claim 1, wherein the digital audio processing device is configured to decode the first digital audio signal output from the multimedia processor, separately output the decoded signal as different types of audio data, convert the output audio data into an analog audio signal, synthesize the analog audio signal as a multi-channel analog audio signal and output the multi-channel analog audio signal to the audio decoder.

* * * * *

UNITED STATES PATENT AND TRADEMARK OFFICE
CERTIFICATE OF CORRECTION

PATENT NO. : 8,954,171 B2
APPLICATION NO. : 11/116287
DATED : February 10, 2015
INVENTOR(S) : Tae-yong Son Page 1 of 1

It is certified that error appears in the above-identified patent and that said Letters Patent is hereby corrected as shown below:

Title page, item (56), column 2, line 2, delete "copywrite" and insert --copyright--, therefor.

Signed and Sealed this
Thirtieth Day of June, 2015

Michelle K. Lee
*Director of the United States Patent and Trademark Office*